Figure 1:
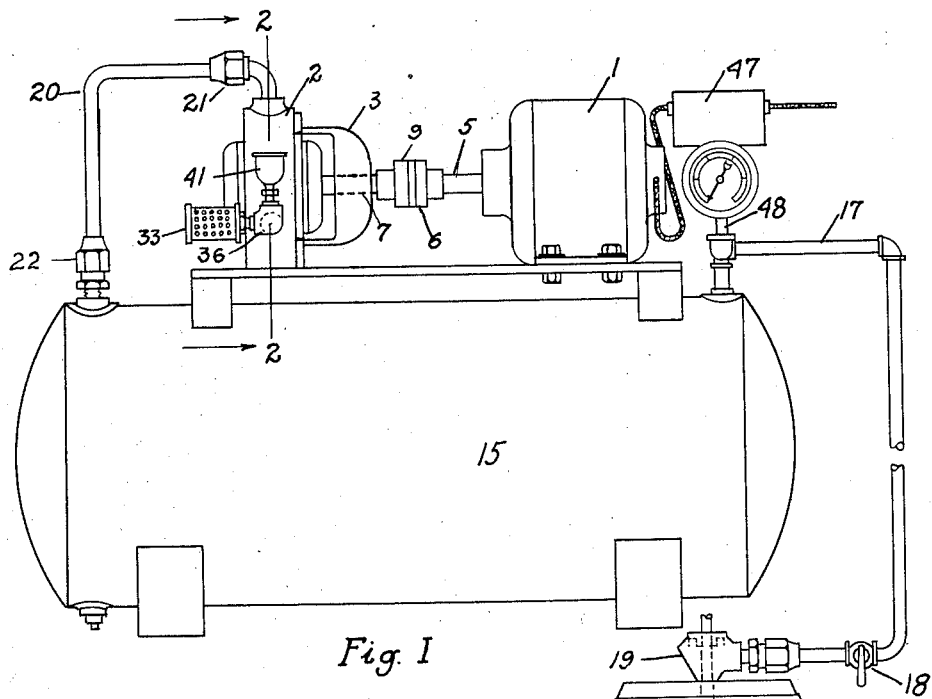

Dec. 31, 1935. J. T. LOANE ET AL 2,026,238
SYSTEM FOR DISPENSING BEVERAGES AND MEANS THEREFOR
Filed Sept. 6, 1933 2 Sheets-Sheet 1

INVENTORS
Joseph Turner Loane
Harry Stanley Offley
BY
William W. Varney
ATTORNEY.

Dec. 31, 1935.  J. T. LOANE ET AL  2,026,238
SYSTEM FOR DISPENSING BEVERAGES AND MEANS THEREFOR
Filed Sept. 6, 1933    2 Sheets-Sheet 2
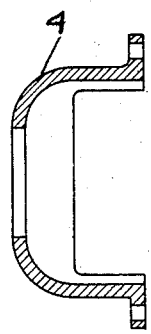
Fig. 3
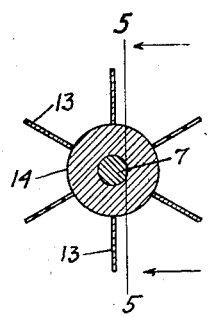
Fig. 4
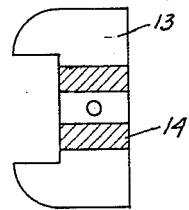
Fig. 5
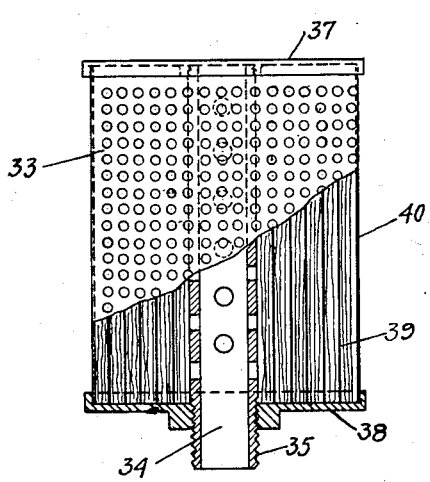
Fig. 6
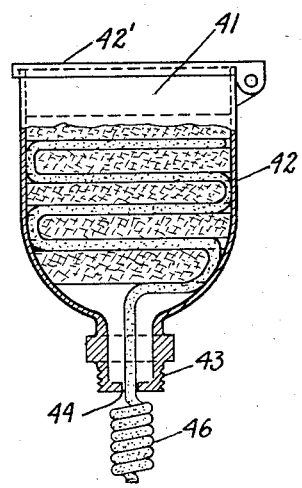
Fig. 7
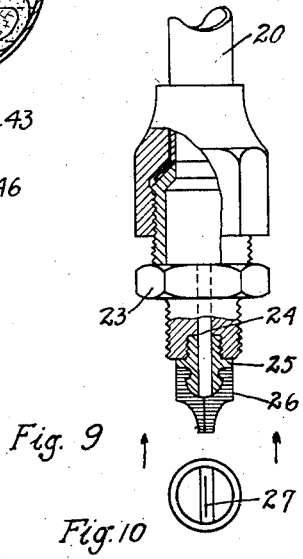
Fig. 9
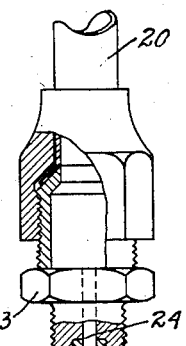
Fig. 8
Fig. 10
INVENTORS.
Joseph Turner Loane
BY Harry Stanley Appley
William W. Varney
ATTORNEY.

Patented Dec. 31, 1935

2,026,238

UNITED STATES PATENT OFFICE 2,026,238

SYSTEM FOR DISPENSING BEVERAGES AND MEANS THEREFOR

Joseph Turner Loane and Harry Stanley Offley, Baltimore, Md.

Application September 6, 1933, Serial No. 688,281

2 Claims. (Cl. 230—152)

We will now refer to beer pumps as illustrative of our system and apparatus.

While beer pumps of the ordinary reciprocating type give satisfaction as to air pressure, they have many serious defects, among which we might mention the almost universal defect of conveying more or less lubricant into the air line from the reciprocating parts of the operating pistons. Another defect, which while perhaps not so apparent, is the slow volume at low pressure; that is, in the requirement for a beer pump a rather large capacity of air in a very short period of time at a low pressure is preferable to a smaller amount of air during a longer period at a higher pressure.

We have discovered that a greater fluctuation of air pressure than 4 lbs. in the beer container is detrimental to the beer. We have used 4 lbs., but the result obtained was not as satisfactory as from the use of 3 lbs., which we have used as a standard, although 4 lbs. will give results not quite as satisfactory perhaps as 3 lbs.

The object of our invention is the providing of control for operating an air pump within narrow limits as to time and speed for controlling the pressure for direct delivery to a beer barrel.

A further object of our invention is the cooling of the air pumping mechanism which is directly connected to the beer dispensing apparatus in order to avoid unduly heating the same with the air heated by compression.

A further object of our invention is the process of beer delivery from a receptacle thereof, consisting of maintaining a definite predetermined pressure substantially within narrow limits in a reservoir directly connected to said container by means of a sensitively controlled rotary pump provided with a cooling means.

A further object of our invention is the providing of an uncontaminated air supply at a substantial pressure as required in beer dispensing, without the intervention of pressure controlling valves between the supply and the dispensing apparatus.

With the foregoing and other objects in view, our invention consists of the methods employed, combination and arrangement of systems, apparatus and means as hereinafter specifically set forth, provided and illustrated in the accompanying drawings wherein is shown the preferred embodiment of our invention, but it is understood that changes, variations and modifications may be resorted to which come within the scope of the claims hereunto appended.

To overcome the defects of existing systems for dispensing fluids and apparatus therefor, we have devised the apparatus shown in the attached drawings as being adapted to perform our process and as illustrative of our invention, we making claims for both process and product.

Figure 2:
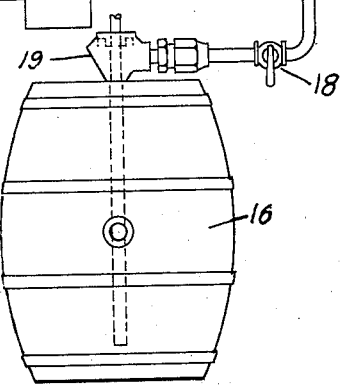
Figure 2:
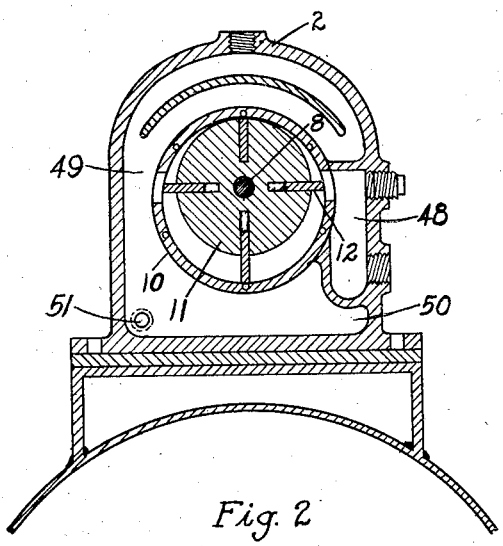

In the drawings of the herein described apparatus, Figure 1 is a side view in elevation of the apparatus as applied to the dispensing of beer particularly, but it may be used for the dispensing of any fluids which might be dispensed by surface pressure; Fig. 2 is a sectional view taken through 2—2 of Fig. 1, looking in the direction of the arrows; Fig. 3 is a vertical sectional view of the cooling fan housing; Fig. 4 is an end view in elevation of the cooling fan; Fig. 5 is a sectional view in elevation of the cooling fan, taken through 5—5 of Fig. 4, looking in the direction of the arrows; Fig. 6 is a vertical view, partly in section, of the air filter; Fig. 7 is a sectional view in elevation of the lubricating device; Fig. 8 is a sectional view in elevation of the improved valve; Fig. 9 is a modification of a check valve which, under certain conditions, we have found desirable in use; and Fig. 10 is an end view, looking in the direction of the arrows, of the check valve shown in Fig. 9.

Similar numerals refer to similar parts throughout the several views.

1 is the prime mover, as illustrated, an electric motor. 2 is a rotary air pump. 3 is a cooling means for the air pump 2, and consists of a centrifugal fan, as shown in the drawings in Figs. 1, 3, 4, and 5, 4 being the fan casing, 5 is the driving-shaft of prime mover 1, the electric motor. 6 is a flexible coupling. 7 is a fan shaft which, as shown, is a continuation of pump driving shaft 8.

Referring particularly to Fig. 2, which is a sectional view taken through 2—2 of the rotary pump 2, looking in the direction of the arrows shown in Fig. 1, 8 is the driving shaft of the pump connected to driving shaft 5 by coupling 9. 10 is the pump housing. 11 is the pump rotor preferably of cast iron which is secured to shaft 8. In rotor 11 are recesses in which pump blades 12 operate. We have found that centrifugal force is sufficient to keep these pump blades in contact with the inner surface of the pump housing 10.

Considerable experimentation was required to select suitable material for pump blades 12. Bakelite, lignum-vitae, and other non-metallic elements were tried and found to be unsatisfactory, owing to their uncertainty as to shape. Considering atmospheric conditions, it has been found that copper alloy is most suitable for resisting corrosion, and gives smooth action; the ferric alloys, as well as aluminum, are unsuitable. We have found that a rotary pump gives large and continuous volume almost instantly upon starting; in other words, is more sensitive in large volume per revolution, which has enabled us to perfect the process of supplying air direct from the pump to the dispenser without large storage capacity or pressure reduction from excessive storage pressures.

The fan 3 is used to circulate air around pump 2 by means of the revolving blades 13, therein. The amount of cooling air required is rather slight. In practice, we have found that for the average draught of beer as shown in the apparatus, a pump operating not more than ten seconds perhaps six times per hour, is sufficient; consequently, very little heat is engendered to be removed by air impact, but this slight air impact is found sufficient to maintain the pump at substantially atmospheric temperature.

Blades 13 are mounted in hub 14, said hub 14 being mounted on shaft 7. 15 is a tank or air reservoir and is of sufficient size to cover the time element of supplying an instant demand to the starting of the pump by the draught control switch, which while slight is appreciable and obviates a flickering in the draught upon starting. The principal use, however, of tank 15 is for shifting kegs where an initial air pressure has to be applied, requiring at times a considerable volume of air. This deficiency is more easily and rapidly overcome by means of substantial storage.

16 is the fluid container for holding the fluid to be dispensed, in the case shown, a beer keg. Container 16 is connected to tank 15 by pipes 17 in which is provided stop-cock 18 used principally in the changing of containers. 19 is a bung attachment, which is a standard article well known in the trade for tapping beer barrels and other containers, and is provided with an air or gas inlet discharging near the top of the barrel, and having a draught or fluid entrance near the bottom of the barrel, the fluid being under constant pressure in said barrel.

Air pump 2 is connected to tank 15 by pipe 20, in which pipe is a coupling element 21 and check valve 22.

The air pump 2, having inlet chamber 48 and discharge chamber 49, is provided with a base chamber 50 having an outlet or drain passage 51. This base chamber 50 permits the moisture which has been thrown out of the air by the pump in its passage through the pump, to collect, and said moisture may be drained from chamber 50 through passage 51 at intervals, as may be required. It should be noted that the discharge chamber 49 and 50 are one and the same chamber in substance, the discharge chamber being recognized per se as the top chamber from which the moisture trickles into the lower part or base chamber 50.

Referring now to check valve 22, and Figs. 8, 9 and 10, the check valve shown in Fig. 1 is of the type shown in Fig. 9 in an enlarged view. 23 is the body of the check valve and fits into a connection, in the case shown into tank 15 at one end, and is provided with a coupling connection for pipe 20 at the other end. Through body 23 is an opening 24 permitting a discharge from pipe 20. 25 is a spud which may be made integral with or attached to body 23, the purpose of said spud being to carry valve 26. Valve 26 is made of soft vulcanized caoutchouc with a slit 27 therein. This makes a very simple and effective check valve for this service, but has the defect of being at times noisy and whistling, and in cases where large service is demanded it has been preferable to use the type of check valve shown in Fig. 8, which is inserted into the pipe line 20 in place of the check valve shown in Fig. 9.

Referring to the check valve shown in Fig. 8, 28 is the body of the valve which is provided at one end with a valve seat or face 29, as shown in the drawings sweated or soldered on to body 28; it would be preferable, however, made integral. 30 is the valve made of soft vulcanized caoutchouc secured at one point by a screw 31. Valve seat or face 29, as shown in the drawings is provided with openings or holes 32 upon which valve 30 operates, thus forming a check valve. This valve is placed in the line 20 as suggested above in place of the valve shown in Fig. 9, and gives free movement to the fluid in one direction only. 33 is an air filter, shown particularly in section in Fig. 6, and consists of perforated inner tube 34 having a threaded end 35 to screw into and form the inlet for pump 2, as shown through a 3-way elbow 36.

On inner tube 34 are secured ends 37 and 38, forming a spool upon which filtering material 39 may be wound. We have found that the filtering material may be slabs of wool batting, 30 felt, or mineral wool slabs wound around and filling up the space between the ends 37 and 38 out to the shell 40, said shell 40 being perforated to permit the entrance of air which passes through the filtering material and through inner tube 34.

At times it is preferable that the air supply for the pump be obtained at a distance from the pump particularly for sanitary reasons; this may be easily accomplished by inserting a length of pipe, or pipe connections, between threaded end 35 and 3-way elbow 36, thus removing the filter some distance from the pump.

Between filter 33 and pump 2 is oiling device 41 which consists of shell 42 with nipple connection 43 for screwing into 3-way elbow 36, or any other convenient location between said air filter to the said air pump. In connection 43 is a very small opening 44. The top of shell 42 is preferably provided with a lid or covering means 42' of some character to protect the lubricant in surplus at the top of said shell from dirt, said covering means preferably making a tight joint to shell 42 to prevent relative excessive atmospheric pressure on the surface of the lubricant with reference to the feeding line of air to the air pump to prevent a sucking of the lubricant into said passage. 46 is a capillary oil conveyer; we have found that the combined cotton woven wire ordinarily used for cleaning smoking pipes forms an exceedingly efficient dispersing means. This is formed into a coil at the lower end to provide a surface for the air in 3-way elbow 36 to contact with, and leads zigzag across the oiling device within shell 42. We have found that the filtering material suggested for the air filter cut into proper circular discs and having the capillary oil conveyer 46 inlaid as shown in Fig. 7, forms an extremely efficient oiling apparatus.

47 is a pneumatic electric control switch for throwing the current on or off of prime mover or motor 1, at a predetermined minimum and maximum pressure desired in tank 15, and is connected to said tank 15 through pipe 48, a gauge being provided in this pipe for observation purposes, the switch 47 having adjusting means not shown. This switch or control means is standard equipment, and we claim nothing concerning the same.

The operation of our invention is as follows:

Bung attachment 19 is inserted in fluid container 16 (a beer keg, if beer is being dispensed) and pipe 17 attached. Stop cock 18 is then opened, which permits any pressure of air in tank 15 to become exerted within conveyor 16; in other words, there is a direct air pressure connection between tank 15 and container 16. We might mention here that the ordinary type of bung attachments are provided with a check valve to prevent a return flow from container 16 to tank 15; this has nothing to do with the pressure regulation of the air.

Upon the air pressure falling in tank 15, pneumatic electric control switch 47 immediately acts, closing the electric circuit thus energizing motor 1 driving the air pump 2. Upon the pressure being restored in tank 15 the same switch 47 again acts to open the circuit, stopping the motor and its attached pump 2, thus within the range desired pneumatic electric control switch 47 acts.

The check valve shown in Fig. 9 is of a unique type in that it is formed of preferably soft rubber into what is known as the ordinary rubber nipple, the perforation in the end, however, being a slit which permits a flow from within the nipple outward, but rejecting a flow from without the nipple inward, as the slit will close upon itself, the rubber forming both valve and valve seat. We have found that a 1 lb. pressure variation is obtainable in the operation of our apparatus, whereas in the ordinary method over 4 lbs is the minimum. In present practice it is preferable to maintain as near as possible 15 lbs. pressure on the beer at the delivery; if the delivery is considerably above the keg or container, additional pressure must be maintained on the container to provide 15 lbs. pressure at delivery.

Having thus described our invention, what we claim and desire to secure by Letters Patent is:

1. In a beverage dispensing apparatus, a prime mover consisting of an electric motor, a rotary vane type air pump driven by said prime mover, said air pump having inlet and outlet passages, means for cooling said rotary vane type air pump, an air filter in said inlet passage through which air is drawn in the supply to said air pump, a capillary oiling device for lubricating the air pump opening into said inlet passage of said air pump, a reservoir, a connection between said reservoir and said air pump, a noiseless check valve of a soft resilient character in said connection to prevent back flow into the air pump, means for discharging from said reservoir air at a substantial pressure engendered by said air pump, automatic means for the control of the starting and stopping of said prime mover operated by the pressure in said reservoir, and means for directly connecting the said reservoir to a beverage container whereby the pressure within the said beverage container is substantially the same as the pressure at the pump and in said reservoir.

2. In a beverage dispensing apparatus, a prime mover consisting of an electric motor, a rotary vane type air pump driven by said prime mover, said air pump having inlet and outlet passages, means for collecting moisture from the condensed air passing through said air pump, said means being provided in the said outlet passage, means for cooling said rotary vane air pump, an air filter in said inlet passage through which air is drawn into said air pump, a capillary oiling device for lubricating the air pump attached to and delivering oil in controlled quantities to the inlet of said pump, a reservoir, a connection between said reservoir and said air pump, a noiseless check valve of a soft resilient character in said connection to prevent a back flow into the air pump, means for discharging from said reservoir air at a substantial pressure engendered by said air pump, automatic means for the control of the starting and stopping of said prime mover operated by the pressure in said reservoir, and means for directly connecting said reservoir to a beverage container whereby the pressure within said beverage container is substantially the same as the pressure at the pump and in said reservoir.

JOSEPH TURNER LOANE.
HARRY STANLEY OFFLEY.